(12) United States Patent
Hwang et al.

(10) Patent No.: US 6,978,071 B2
(45) Date of Patent: Dec. 20, 2005

(54) APPARATUS FOR CLEAVING OPTICAL FIBER

(75) Inventors: Myeon-soon Hwang, Suwon (KR); Byung-gon Kim, Seoul (KR); Hong-suk Sun, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 91 days.

(21) Appl. No.: 10/658,297

(22) Filed: Sep. 10, 2003

(65) Prior Publication Data

US 2004/0120678 A1 Jun. 24, 2004

(30) Foreign Application Priority Data

Dec. 24, 2002 (KR) ........................ 10-2002-0083346

(51) Int. Cl.⁷ ........................... G02B 6/00; H02G 1/12; B26F 3/02; B65H 35/10
(52) U.S. Cl. ..................... 385/134; 225/6; 225/21; 225/22; 225/94; 81/9.4; 81/9.41; 81/9.42; 81/9.51
(58) Field of Search .................... 225/93, 93.5, 94, 225/96, 103, 104, 105; 81/9.4, 9.41, 9.42, 81/9.51

(56) References Cited

U.S. PATENT DOCUMENTS

| | | | |
|---|---|---|---|
| 4,445,632 A * | 5/1984 | Margolin et al. ............... 225/2 |
| 5,351,333 A | 9/1994 | Chambers | |
| 5,353,366 A | 10/1994 | Bossard | |
| 5,395,025 A * | 3/1995 | Borer et al. .................... 225/2 |
| 5,501,385 A * | 3/1996 | Halpin ......................... 225/96 |
| 5,838,850 A | 11/1998 | Mansfield et al. | |
| 5,946,986 A * | 9/1999 | Dodge et al. ................. 81/9.51 |
| 6,023,996 A * | 2/2000 | Dodge et al. ................. 81/9.51 |
| 6,052,880 A * | 4/2000 | Basavanhally ............... 29/33.5 |
| 6,099,392 A * | 8/2000 | Wiegand et al. ............... 451/41 |
| 6,122,936 A * | 9/2000 | Csipkes et al. ............... 65/485 |
| 6,321,621 B1 * | 11/2001 | Stepan ........................ 81/9.51 |
| 6,577,804 B2 * | 6/2003 | Murakami et al. .......... 385/147 |
| 6,668,128 B2 * | 12/2003 | Hattori et al. ............... 385/136 |
| 6,676,763 B2 * | 1/2004 | Johnson et al. ................. 134/1 |
| 6,816,662 B2 * | 11/2004 | Doss et al. ................... 385/134 |
| 2002/0064354 A1 * | 5/2002 | Ware et al. .................... 385/95 |
| 2002/0064355 A1 | 5/2002 | Ware et al. | |
| 2002/0130152 A1 | 9/2002 | Cripps, Jr. | |
| 2002/0145731 A1 * | 10/2002 | Kritler et al. .............. 356/73.1 |

FOREIGN PATENT DOCUMENTS

EP 1 031 857 A1 8/2000
EP 0127671A1200 19WO 10/2000

(Continued)

Primary Examiner—Frank G. Font
Assistant Examiner—Charlie Peng
(74) Attorney, Agent, or Firm—Staas & Halsey LLP

(57) ABSTRACT

An apparatus to cleave an optical fiber includes a base plate, a jig slidably provided on the base plate and holding the optical fiber, a stripper provided near the jig, and including a hot plate heating a sheath of the optical fiber, a sheath cutter cleaving the sheath of the optical fiber to be stripped, a cleaning part cleaning the optical fiber after the sheath of the optical fiber is stripped according as the jig slides, and a cleaver provided on the base plate and cleaving the optical fiber whose sheath is stripped by the stripper. With this configuration, an apparatus is provided to cleave an optical fiber, in which stripping and cleaning processes are simultaneously performed in a stripper, so that the whole process of cleaving the optical fiber is decreased, and the structure of the apparatus is simplified without the conventional cleaning part.

33 Claims, 7 Drawing Sheets

FOREIGN PATENT DOCUMENTS

| | | |
|---|---|---|
| EP | 1 241 496 A2 | 9/2002 |
| JP | 5-80219 | 4/1993 |
| KR | 1987-0005260 | 6/1987 |
| KR | 10-034 1693 | 6/2002 |
| KR | 2002-0067046 | 8/2002 |
| KR | 2002-0073476 | 9/2002 |

* cited by examiner

APPARATUS FOR CLEAVING OPTICAL FIBER

CROSS-REFERENCE TO RELATED APPLICATIONS

This application claims the benefit of Korean Patent Application No. 2002-83346, filed Dec. 24, 2002, in the Korean Intellectual Property Office, the disclosure of which is incorporated herein by reference.

BACKGROUND OF THE INVENTION

1. Field of the Invention

The present invention relates to an apparatus for cleaving an optical fiber, and more particularly, to an apparatus for cleaving an optical fiber, wherein the apparatus quickly and precisely cleaves the optical fiber.

2. Description of the Related Art

Optical fibers are connected to each other and branched off by an optical coupler or an optical connector, which requires precisely cleaved optical fibers.

Generally, in a conventional apparatus for cleaving the optical fiber, a sharp blade first makes a cleaved line on a cladding of the optical fiber, and then the optical fiber is pulled in opposite directions, thus cleaving the optical fiber in the cleaved line. The apparatus for cleaving the optical fiber is manually or semiautomatically operated, and there are various apparatuses for cleaving the optical fiber. However, in most of the conventional apparatuses for cleaving the optical fiber, stripping, cleaning and cleaving processes are independently performed by separate units, increasing working time, and thus decreasing work efficiency.

Recently, an automatic fiber preparation unit for slicing was disclosed in U.S. Patent Publication No. 2002-64354, in which the stripping, cleaning and cleaving processes are successively performed by one united unit. Therefore, the proposed apparatus for cleaving the optical fiber has an improved work efficiency because of the combined units.

However, in the disclosed apparatus for cleaving the optical fiber, a cleaning unit to clean the optical fiber whose sheath is stripped, a space to be occupied by the cleaning unit, and a driving unit to transfer the optical fiber to the cleaning unit are also needed. Therefore, the volume of the apparatus is increased, and the structure is more complicated, prolonging working time and decreasing work efficiency.

Further, a cutter cutting the optical fiber should be [frequently] replaced frequently by a new one to ensure precise] cleavage of the optical fiber. However, it is inconvenient for a user to replace the cutter with a new one using the conventional apparatus for cleaving the optical fiber.

SUMMARY OF THE INVENTION

Accordingly, it is an aspect of the present invention to provide an apparatus to cleave an optical fiber, wherein the apparatus has a simple structure, thus increasing work efficiency.

Additional aspects and advantages of the invention will be set forth in part in the description which follows and, in part, will be obvious from the description, or may be learned by practice of the invention.

The foregoing and/or other aspects of the present invention are achieved by providing an apparatus to cleave an optical fiber, the apparatus comprising: a base plate; a jig slidably provided on the base plate and holding the optical fiber; a stripper provided near the jig, and including a hot plate heating a sheath of the optical fiber, a sheath cutter cleaving the sheath of the optical fiber to be stripped, a cleaning part to clean the optical fiber after the sheath of the optical fiber is stripped as the jig slides; and a cleaver provided on the base plate and cleaving the optical fiber whose sheath is stripped by the stripper.

According to an aspect of the invention, the jig comprises a jig plate formed with a groove on which the optical fiber is put, and a holding member holding the optical fiber put on the groove.

According to an aspect of the invention, the holding member includes a cover rotatably combined to the jig plate, and a compression part made of elastic material and provided in the cover to allow the cover to elastically hold the optical fiber.

According to an aspect of the invention, the cleaning part of the stripper includes an injection hole through which a cleaner is injected onto the optical fiber whose sheath is stripped.

According to an aspect of the invention, the cleaver comprises a gripper clamping the optical fiber, a cutting wheel making a cleaved line in a lower part of the optical fiber clamped by the gripper, and a compression block compressing the optical fiber put on the cutting wheel to cleave the optical fiber.

According to an aspect of the invention, the gripper, the cutting wheel and the compression block are operated by cylinder actuators, respectively.

According to an aspect of the invention, the gripper is partially covered with silicone to prevent the optical fiber from being damaged while clamping the optical fiber.

According to an aspect of the invention, the apparatus further comprises a rotation unit connected to the cutting wheel and rotating the cutting wheel.

According to an aspect of the invention, the apparatus further comprises a height adjusting unit connected to the cutting wheel and adjusting the height of the cutting wheel.

According to an aspect of the invention, the jig and the stripper are simultaneously operated by a driving unit.

According to an aspect of the invention, the driving unit comprises a motor, a timing pulley rotated by the motor and sliding the jig, and a cam rotated by the motor and reciprocating the stripper.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
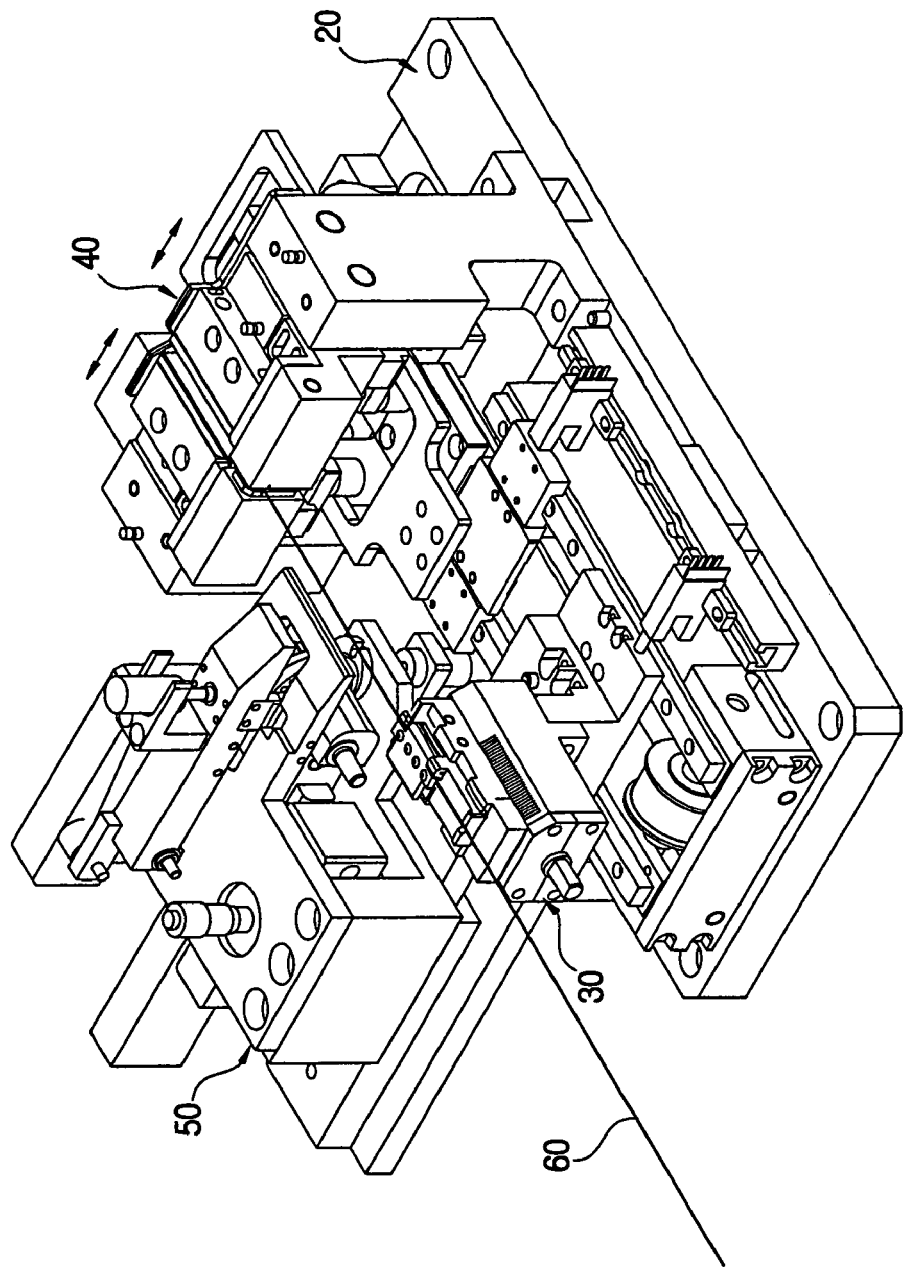
FIG. 1 is a perspective view of an apparatus to cleave an optical fiber according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
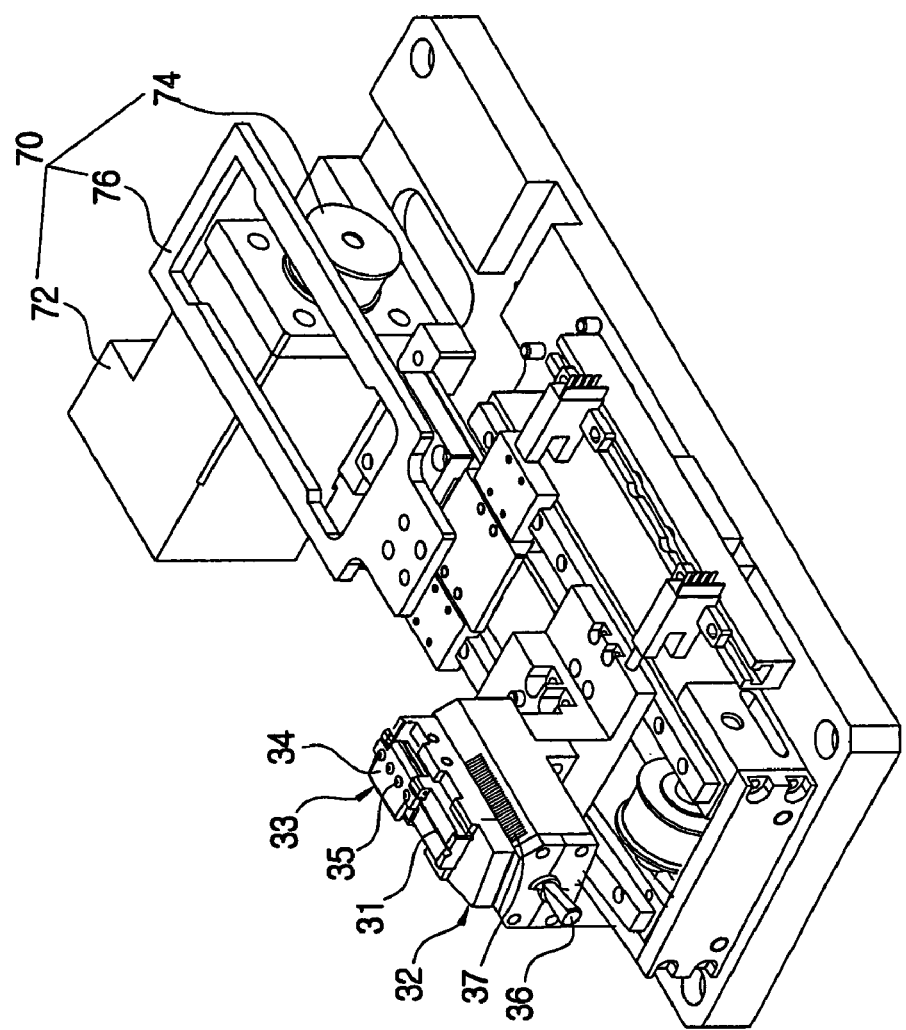
FIG. 2 is a perspective view for illustrating an installation state of a jig and a driving unit in the apparatus of FIG. 1.
Figure 3:
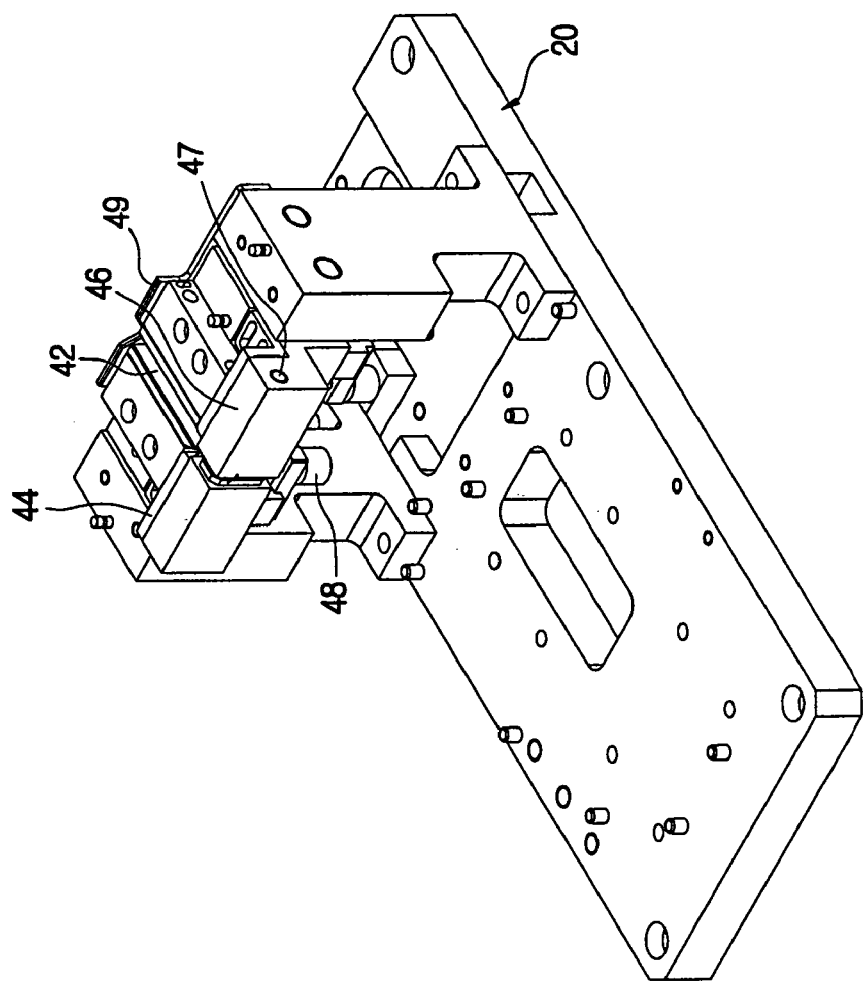
FIG. 3 is a perspective view of a stripper of FIG. 1.

As shown in FIGS. 1 through 3, an apparatus according to an embodiment of the present invention to cleave an optical fiber comprises a base plate 20, a jig 30 slidably provided on the base plate 20 and holding an optical fiber 60, a stripper 40 provided with a hot plate 42 heating a sheath of the optical fiber 60, a sheath cutter 44 cutting the sheath of the optical fiber 60 to be stripped, a cleaning part 46 cleaning the optical fiber 60 after the sheath of the optical fiber 60 is stripped as the jig 30 slides, and a cleaver 50 provided on the base plate 20 and cleaving the optical fiber 60 whose sheath is stripped by the stripper 40. The base plate 20 supports the jig 30, the stripper 40 and the cleaver 50.

The jig 30 comprises a jig plate 32 formed with a groove 31 on which the optical fiber 60 is put, and a holding member 33 holding the optical fiber 60 put on the groove 31. The holding member 33 includes a cover 34 rotatably combined to the jig plate 32, and a compression part 35 made of elastic material and provided in the cover 34 to allow the cover 34 to hold the optical fiber 60 elastically. Here, the jig 30 includes a length adjusting lever 36 and a scale mark 37, so that the length from the end of the jig 30 to the end of the optical fiber 60 can be adjusted.

The hot plate 42 heats the sheath of the optical fiber 60 at a suitable temperature (about 110° C.) to strip the sheath of the optical fiber 60 readily, wherein the hot plate 42 is usually employed in the apparatuses for cleaving the optical fiber. The sheath cutter 44 comprises two opposite blades (not shown) to be opened and closed and precisely cuts only the sheath of the optical fiber 60, wherein the structure of the sheath cutter 44 can vary. The cleaning part 46 includes an injection hole 47 through which a cleaner is injected at a high pressure onto the optical fiber 60 whose sheath is stripped. The cleaner may be comprised of various materials, e.g., alcohol. With this technique, stripping the sheath of the optical fiber 60 and cleaning the optical fiber 60 are performed at the same time, thus increasing work efficiency.

On the other hand, the jig 30 and the stripper 40 are simultaneously driven by a driving unit 70. The driving unit 70 comprises a motor 72, a timing pulley 74 rotated by the motor 72 and sliding the jig 30, and a cam 76 reciprocating the stripper 40. However, the driving unit 70 may be provided in the jig and the stripper, respectively. Further, various actuators such as a cylinder can be employed as the driving unit as necessary.

In FIG. 3, a reference numeral "48" indicates a cam follower bearing 48 supporting the cam 76 being rotated by the motor 72, and a reference numeral "49" indicates an optical fiber holder 49 holding the optical fiber 60.

As shown in FIGS. 4 through 7, the cleaver 50 comprises a gripper 52 clamping the optical fiber 60, a cutting wheel 54 making a cleaved line in a lower part of the optical fiber 60 clamped by the gripper 52, and a compression block 56 compressing the optical fiber 60 put on the cutting wheel 54 to cleave the optical fiber 60.

Further, the gripper 52, the cutting wheel 54 and the compression block 56 are operated by a gripper cylinder 57, a cutting wheel cylinder 58 and a compression block cylinder 59, respectively.

The gripper 52 is partially covered with silicone to prevent the optical fiber 60 from being damaged while clamping the optical fiber 60, and clamps the optical fiber 60 in opposite sides of a cleaving point to increase clamping efficiency.

The cutting wheel 54 is connected to, and stepwise rotated by, a rotation unit. The rotation unit is provided beside the cutting wheel 54, and comprises a main body 82 whose rim is formed with a plurality of ball grooves 81, and a ball pusher 84 moving up and down by operation of a ball pusher cylinder 83 to be in contact with, and apart from, the ball groove 81 of the main body 82. Therefore, when a blade of the cutting wheel 54 is damaged, the damaged blade of the cutting wheel 54 is quickly replaced with a new blade of the cutting wheel 54 by moving the cutting wheel 54 backward (in a right direction in FIG. 7) so that the ball pusher 84 is in contact with the ball groove 81. Here, the moment the cutting wheel 54 moves backward, the cutting wheel 54 rotates clockwise by one step because of the ball pusher 84. Further, the cutting wheel 54 is connected to a height adjusting unit to adjust the height of the cutting wheel 54, so that the depth of the cleaved line can be adjusted according to the kind of the optical fiber 60. The height adjusting unit comprises a supporting block 85 attached to the cutting wheel 54, a height adjusting lever 86 provided above the supporting block 85 and moving the supporting block 85 up and down by rotation thereof, and a compression spring 87 elastically supporting the supporting block 85. Here, the rotation unit and the height adjusting unit of the cutting wheel 54 may have various configurations.

Figure 4:
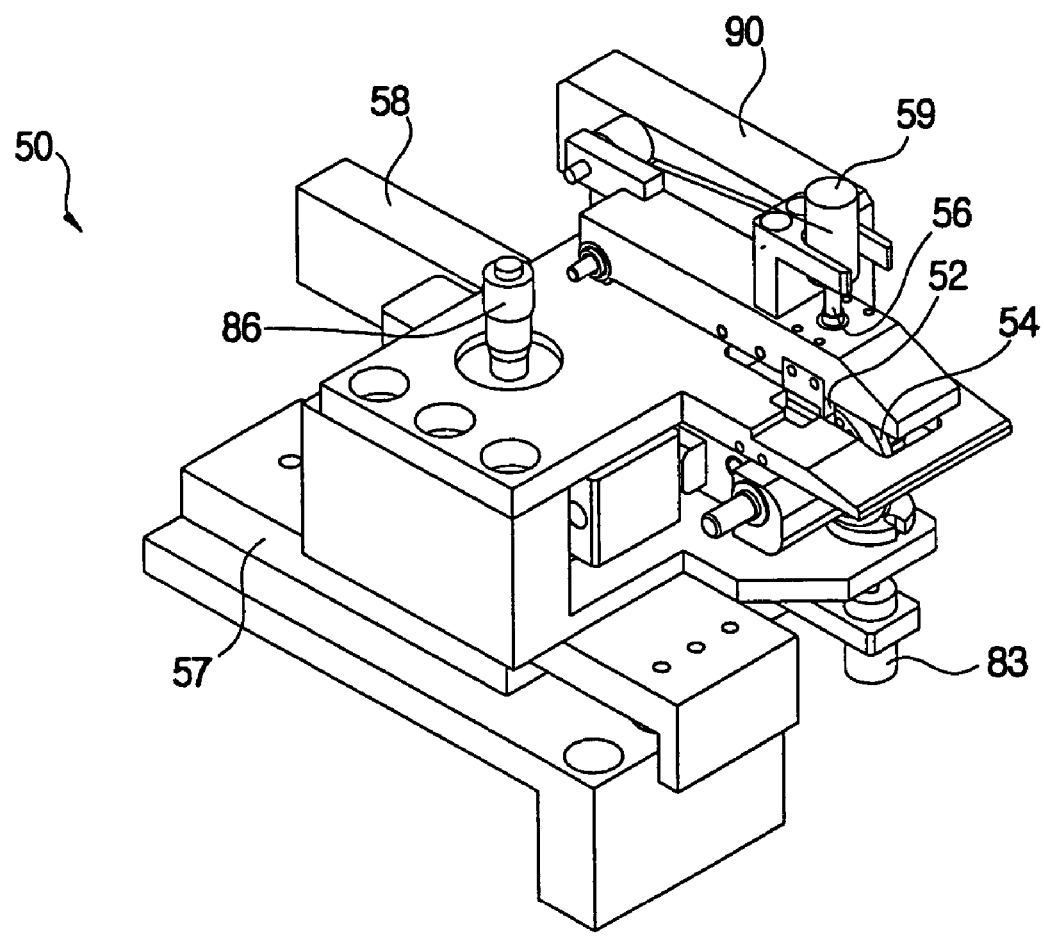
FIG. 4 is a perspective view of a cleaver of FIG. 1.
Figure 5:
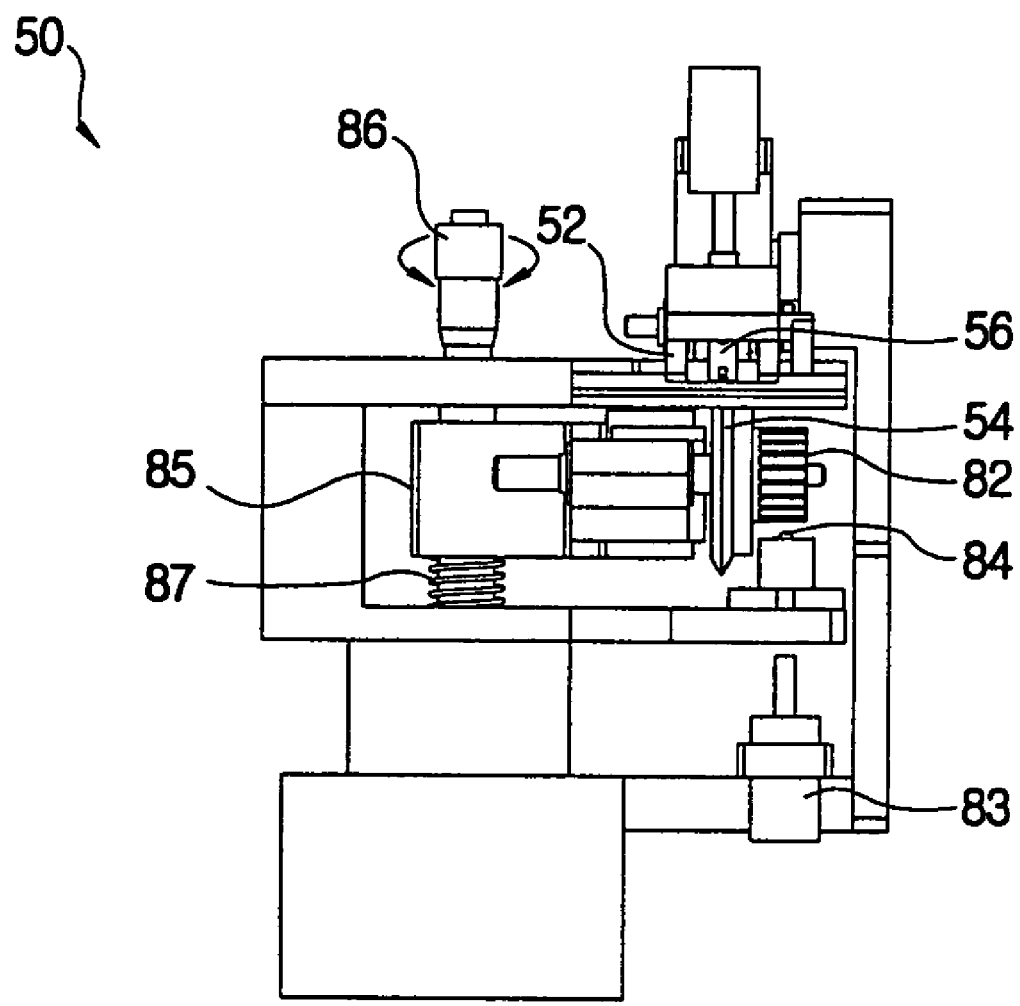
FIG. 5 is a front view of the cleaver of FIG. 4.
Figure 6:
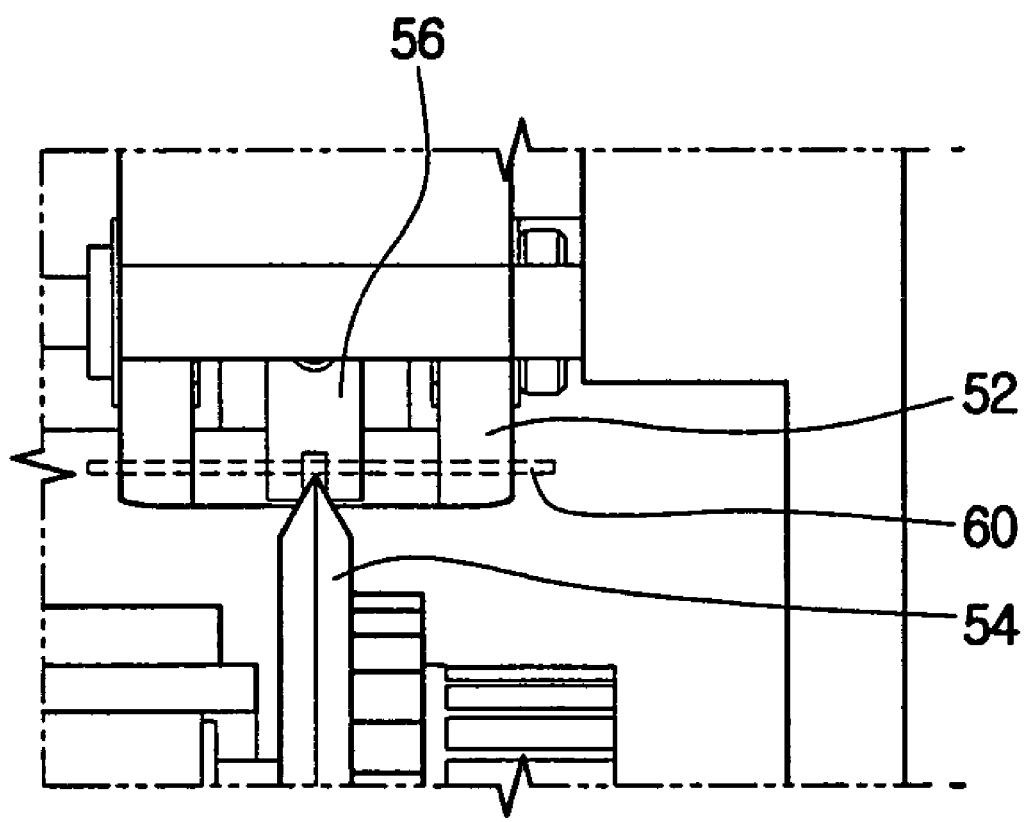
FIG. 6 is a partially enlarged perspective view illustrating that the optical fiber is being cleaved by the cleaver of FIG. 5.
Figure 7:
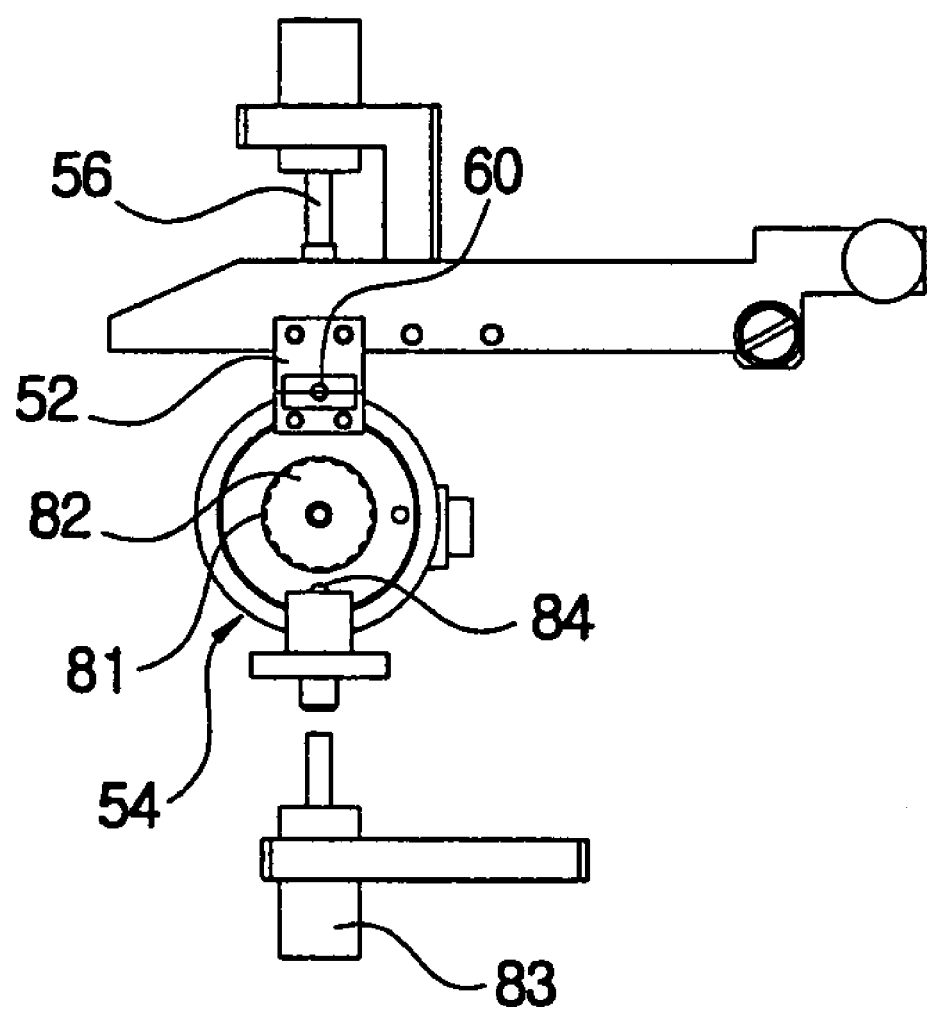
FIG. 7 is a side view of the cleaver of FIG. 4.

In FIG. 4, a reference numeral "90" indicates a gripper cam 90 reciprocating the gripper cylinder 57. With this configuration, the apparatus according to an embodiment of the present invention to cleave the optical fiber operates as follows.

A. Holding the optical fiber: the optical fiber 60 is firmly held in the jig 30. At this time, the jig 30 is positioned close to the stripper 40, so that a first part of the optical fiber 60 is held by the jig 30, and a second part of the optical fiber 60 is put on the stripper 40.

B. Stripping the sheath of the optical fiber: the jig 30 is slid by the operation of driving unit 70, being apart from the stripper 40. At this time, the sheath cutter 44 cuts the sheath of the optical fiber 60 to be stripped, the hot plate compartment is closed, and the hot plate 42 heats the sheath of the optical fiber 60 for a predetermined period of time. Here, during the time (4~5 seconds) to heat the sheath of the optical fiber 60 when the hot plate compartment is completely closed, the jig 30 stops sliding.

After the heating time, the driving unit 70 operates the jig 30 to be slid, thus stripping the heated sheath of the optical fiber 60. Simultaneously, the optical fiber 60 whose sheath is stripped is cleaned by passing through the cleaning part 46. Thereafter, the hot plate compartment is opened.

C. Cleaving the optical fiber: the gripper 52 of the cleaver 50 moves and clamps the optical fiber 60, and then the cutting wheel 54 moves and makes the cleaved line in the lower part of the optical fiber 60. Thereafter, the compression block 56 compresses the optical fiber 60, thus cleaving the optical fiber 60.

Then, the gripper 52, the cutting wheel 54 and the compression block 56 are reset and are returned to an original position.

As described above, the present invention provides an apparatus to cleave an optical fiber, wherein stripping and cleaning processes are simultaneously performed in a stripper, so that the whole process of cleaving the optical fiber is decreased, and the structure of the apparatus is simplified without the conventional cleaning part.

Further, the present invention provides an apparatus to cleave an optical fiber, wherein a cutting wheel is rotatable so that a blade of the cutting wheel is quickly replaced with a new one.

Further, the present invention provides an apparatus to cleave an optical fiber, wherein the height of a cutting wheel is adjustable, so that the depth of a cleaved line is adjustable, thus precisely cleaving the optical fiber.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An apparatus to cleave an optical fiber, comprising:
    a base plate;
    a jig slidably provided on the base plate and holding the optical fiber;
    a stripper provided proximate to the jig, and including a hot plate heating a sheath of the optical fiber, a sheath cutter cleaving the sheath of the optical fiber to be stripped, a cleaning part cleaning the optical fiber after the sheath of the optical fiber is stripped as the jig slides; and
    a cleaver provided on the base plate and cleaving the optical fiber whose sheath is stripped by the stripper,
    wherein the cleaver comprises a gripper clamping the optical fiber, a cutting wheel making a cleaved line in a lower part of the optical fiber clamped by the gripper, and a compression block compressing the optical fiber placed on the cutting wheel to cleave the optical fiber.

2. The apparatus according to claim 1, wherein the jig comprises a jig plate formed with a groove on which the optical fiber is put, and a holding member holding the optical fiber put on the groove.

3. The apparatus according to claim 2, wherein the holding member includes a cover rotatably combined to the jig plate, and a compression part of elastic material in the cover to allow the cover to elastically hold the optical fiber.

4. The apparatus according to claim 1, wherein the cleaning part of the stripper includes an injection hole through which a cleaner is injected to the optical fiber whose sheath is stripped.

5. The apparatus according to claim 1, further comprising cylinder actuators to operate the gripper, the cutting wheel and the compression block, respectively.

6. The apparatus according to claim 1, wherein the gripper is partially covered with silicone to prevent the optical fiber from being damaged while clamping the optical fiber.

7. The apparatus according to claim 1, further comprising a rotation unit connected to the cutting wheel and rotating the cutting wheel.

8. The apparatus according to claim 1, further comprising a height adjusting unit connected to the cutting wheel and adjusting the height of the cutting wheel.

9. The apparatus according to claim 1, further comprising a driving unit to operate the jig and the stripper simultaneously.

10. The apparatus according to claim 9, wherein the driving unit comprises:
    a motor;
    a timing pulley rotated by the motor and sliding the jig; and
    a cam rotated by the motor and reciprocating the stripper.

11. An apparatus to cleave an optical fiber, comprising:
    a jig slidably holding the optical fiber;
    a stripper provided proximate to the jig, and including a hot plate heating a sheath of the optical fiber, a sheath cutter cleaving the sheath of the optical fiber to be stripped, a cleaning part cleaning the optical fiber after the sheath of the optical fiber is stripped as the jig slides; and
    a cleaver proximate to the jig and cleaving the optical fiber whose sheath is stripped by the stripper,
    wherein the cleaver comprises a gripper clamping the optical fiber, a cutting wheel making a cleaved line in a lower part of the optical fiber clamped by the gripper, and a compression block compressing the optical fiber placed on the cutting wheel so as to cleave the optical fiber.

12. The apparatus according to claim 11, wherein the jig is located on a base plate.

13. The apparatus according to claim 12, wherein the jig comprises a jig plate formed with a groove on which the optical fiber is put, and a holding member holding the optical fiber put on the groove.

14. The apparatus according to claim 13, wherein the holding member includes a cover rotatably combined to the jig plate, and a compression part of elastic material in the cover to allow the cover to elastically hold the optical fiber.

15. The apparatus according to claim 11, wherein the cleaning part of the stripper includes an injection hole through which a cleaner is injected to the optical fiber whose sheath is stripped.

16. The apparatus according to claim 11, further comprising cylinder actuators to operate the gripper, the cutting wheel and the compression block, respectively.

17. The apparatus according to claim 11, wherein the gripper is partially covered with silicone to prevent the optical fiber from being damaged while clamping the optical fiber.

18. The apparatus according to claim 11, further comprising a rotation unit connected to the cutting wheel and rotating the cutting wheel.

19. The apparatus according to claim 11, further comprising a height adjusting unit connected to the cutting wheel and adjusting the height of the cutting wheel.

20. The apparatus according to claim 11, further comprising a driving unit to operate the jig and the stripper simultaneously.

21. The apparatus according to claim 20, wherein the driving unit comprises:
    a motor;
    a timing pulley rotated by the motor and sliding the jig; and
    a cam rotated by the motor and reciprocating the stripper.

22. An apparatus to cleave an optical fiber, comprising:
    a heated stripper to strip a sheath off the optical fiber and clean an unsheathed optical fiber after stripping the sheath off the optical fiber; and
    a cleaver proximate to the heated stripper and cleaving the unsheathed optical fiber,
    wherein the cleaver comprises a gripper clamping the optical fiber, a cutting wheel making a cleaved line in a lower part of the optical fiber clamped by the gripper, and a compression block compressing the optical fiber placed on the cutting wheel so as to cleave the optical fiber.

23. The apparatus according to claim 22, wherein the heated stripper comprises:
   a hot plate to heat the sheath of the optical fiber;
   a sheath cutter to cleave the sheath of the optical fiber; and
   a cleaning part to clean the unsheathed optical fiber.

24. The apparatus according to claim 23, further including a jig proximate to the heated stripper and cleaver and located on a base plate to hold the optical fiber.

25. The apparatus according to claim 24, wherein the jig comprises a jig plate formed with a groove on which the optical fiber is put, and a holding member holding the optical fiber put on the groove.

26. The apparatus according to claim 25, wherein the holding member includes a cover rotatably combined to the jig plate, and a compression part of elastic material in the cover to allow the cover to elastically hold the optical fiber.

27. The apparatus according to claim 23, wherein the cleaning part of the heated stripper includes an injection hole through which a cleaner is injected to the optical fiber whose sheath is stripped.

28. The apparatus according to claim 22, further comprising cylinder actuators to operate the gripper, the cutting wheel and the compression block, respectively.

29. The apparatus according to claim 22, wherein the gripper is partially covered with silicone to prevent the optical fiber from being damaged while clamping the optical fiber.

30. The apparatus according to claim 22, further comprising a rotation unit connected to the cutting wheel and rotating the cutting wheel.

31. The apparatus according to claim 22, further comprising a height adjusting unit connected to the cutting wheel and adjusting the height of the cutting wheel.

32. The apparatus according to claim 24, further comprising a driving unit to operate the jig and the heated stripper simultaneously.

33. The apparatus according to claim 32, wherein the driving unit comprises:
   a motor;
   a timing pulley rotated by the motor and sliding the jig; and
   a cam rotated by the motor and reciprocating the heated stripper.

* * * * *